United States Patent
Guha et al.

(10) Patent No.: US 8,868,654 B2
(45) Date of Patent: Oct. 21, 2014

(54) PRIVACY-PRESERVING MATCHING SERVICE

(75) Inventors: Saikat Guha, Karnataka (IN); Venkata N. Padmanabhan, Karnataka (IN); Mudit Jain, Rajasthan (IN); Ankush Jain, Rajasthan (IN)

(73) Assignee: Microsoft Corporation, Redmond, WA (US)

(*) Notice: Subject to any disclaimer, the term of this patent is extended or adjusted under 35 U.S.C. 154(b) by 193 days.

(21) Appl. No.: 13/153,475

(22) Filed: Jun. 6, 2011

(65) Prior Publication Data

US 2012/0311035 A1 Dec. 6, 2012

(51) Int. Cl.
G06F 15/16 (2006.01)
G06Q 50/00 (2012.01)
G06Q 30/08 (2012.01)

(52) U.S. Cl.
CPC ............... *G06Q 30/08* (2013.01); *G06Q 50/01* (2013.01)
USPC ........................................................ 709/204

(58) Field of Classification Search
CPC ................... H04L 63/0421; G06F 21/6254
USPC ........................................................ 709/204
See application file for complete search history.

(56) References Cited

U.S. PATENT DOCUMENTS

| | | | |
|---|---|---|---|
| 6,327,574 B1 | 12/2001 | Kramer et al. | |
| 8,209,310 B1* | 6/2012 | Metcalfe | 707/705 |
| 2002/0099570 A1* | 7/2002 | Knight | 705/2 |
| 2006/0122974 A1* | 6/2006 | Perisic | 707/3 |
| 2009/0150362 A1* | 6/2009 | Evenhaim | 707/3 |
| 2009/0307087 A1* | 12/2009 | Haas | 705/14.53 |
| 2009/0327296 A1 | 12/2009 | Francis et al. | |
| 2010/0042833 A1* | 2/2010 | Platt | 713/168 |
| 2010/0063830 A1* | 3/2010 | Kenedy et al. | 705/1 |
| 2011/0202774 A1* | 8/2011 | Kratsch | 713/189 |

OTHER PUBLICATIONS

Li et al. FindU: Privacy-Preserving Personal Profile Matching in Mobile Social Networks. Jul. 29, 2010.*
Mohammed, Nomad. Privacy-Preserving Data Mashup. ACM 2009.*
"Privacy-preserving Digital Identity Management for Cloud Computing", Retrieved at <<http://www.chinacloud.cn/upload/2009-06/09063000211137.pdf#page=23 >>, 2009, pp. 1-87.
Agrawal, et al., "A Framework for High-Accuracy Privacy-Preserving Mining", Retrieved at <<http://arxiv.org/PS_cache/cs/pdf/0407/0407035v1.pdf >>, Proceedings of the 21st International Conference on Data Engineering, 2005, p. 1-14.
Nabeel, et al., "Privacy-Preserving Filtering and Covering in Content-Based Publish Subscribe Systems", Retrieved at << https://www.cerias.purdue.edu/assets/pdf/bibtex_archive/2009-15.pdf >>, 2010, pp. 1-33.

(Continued)

*Primary Examiner* — Bryan Lee
(74) *Attorney, Agent, or Firm* — Dan Choi; Judy Yee; Micky Minhas

(57) ABSTRACT

Described herein are technologies pertaining to protecting user privacy in connection with attribute-based matching services. A user registers with a platform that includes a plurality of non-collaborating partitions, where registration includes transmitting a message to the platform that indicates that the user has one or more attributes corresponding thereto. Through selective encryption and a communications protocol amongst the partitions, none of the partitions are able to ascertain that the user has the attributes. Acting in conjunction, however, the plurality of partitions perform rich attribute.

20 Claims, 9 Drawing Sheets

(56) References Cited

OTHER PUBLICATIONS

McSherry, Frank, "Privacy Integrated Queries: An Extensible Platform for Privacy-Preserving Data Analysis", Retrieved at << http://research.microsoft.com/pubs/80218/sigmod115-mcsherry.pdf >>, Proceedings of the 35th SIGMOD international conference on Management of data, Jun. 29-Jul. 2, 2009, pp. 1-12.

Pearson, et al., "A Privacy Manager for Cloud Computing", Retrieved at << http://www.hpl.hp.com/techreports/2009/HPL-2009-156.pdf >>, Proceedings of the 1st International Conference on Cloud Computing, 2009, pp. 1-12.

"Advanced Encryption Standard", Retrieved at << http://en.wikipedia.org/wiki/Advanced_Encryption_Standard >>, Retrieved Date : Mar. 1, 2011, pp. 1-9.

Bethencourt, et al., "Ciphertext-Policy Attribute-based Encryption", Retrieved at << http://www.cs.berkeley.edu/~bethenco/oakland07cpabe.pdf >>, Proceedings of the IEEE Symposium on Security and Privacy, 2007, pp. 1-15.

Chaum, David, "Untraceable Electronic Mail, Return Addresses, and Digital Pseudonyms", Retrieved at << http://citeseer.ist.psu.edu/viewdoc/download;jsessionid=1213ED37BEF979BCA8 8B8D5E4FEC3007?doi=10.1.1.128.8210&rep=rep1&type=pdf >>, Communications of the ACM, vol. 24 No. 2, Feb. 1981, pp. 1-8.

Elminaam, et al., "Evaluating the Performance of Symmetric Encryption Algorithm", Retrieved at << http://ijns.femto.com.tw/contents/ijns-v10-n3/ijns-2010-v10-n3-p216-222.pdf >>, International Journal of Network Security, vol. 10 No. 3, May 2010, pp. 216-222.

Dingledine, et al., "Tor: The Second-generation Onion Router", Retrieved at << https://svn.torproject.org/svn/projects/design-paper/tor-design.pdf >>, In Proceedings of the 13th USENIX Security Symposium, 2004, pp. 1-17.

Dolev, et al., "On the Security of Public Key Protocols", Retrieved at << http://www.cs.huji.ac.il/~dolev/pubs/dolev-yao-ieee-01056650.pdf >>, IEEE Transactions on Information Theory, vol. IT-29, No. 2, March 1983, p. 198-208.

Dong, et al., "Shared and Searchable Encrypted Data for Untrusted Servers", Retrieved at << http://www.doc.ic.ac.uk/~cd04/papers/dbsec08.pdf >>, Dec. 9, 2009, pp. 1-30.

Douceur, John R., "The Sybil Attack", Retrieved at << http://citeseerx.ist.psu.edu/viewdoc/download?doi=10.1.1.17.1073&rep=rep1&type=pdf >>, Revised Papers from the First International Workshop on Peer-to-Peer Systems, 2002, pp. 1-6.

Dwork, Cynthia, "Differential Privacy", Retrieved at << http://www.cs.utsa.edu/~wzhang/dbpapers/ppdm/icalp06-dwork-differentialPrivacy.pdf >>, Proceedings of the 5th international conference on Theory and applications of models of computation, 2008, pp. 1-12.

"Foursquare", Retrieved at << http://foursquare.com/ >>, Mar. 1, 2011, p. 1.

Goyal, et al., "Attribute-based Encryption for Fine-grained Access Control of Encrypted Data", Retrieved at << http://www.cs.ucla.edu/~sahai/work/web/2006%20Publications/ACM_CCS2006.pdf >>, Proceedings of the 13th ACM conference on Computer and communications security, Oct. 30-Nov. 3, 2006, pp. 89-98.

Greenberg, et al., "VL2: A Scalable and Flexible Data Center Network", Retrieved at << http://ccr.sigcomm.org/online/files/p51.pdf >>, Proceedings of the ACM SIGCOMM conference on Data communication, Aug. 17-21, 2009, pp. 51-62.

Ion, et al., "Providing Confidentiality in Content-based Publish/Subscribe Systems", Retrieved at << http://www.create-net.org/inspire/downloads/secrypt10.pdf >>, Proceedings of the International Conference on Security and Cryptography (SECRYPT), Jul. 26-28, 2010, pp. 1-6.

Irwin, et al., "Self-recharging Virtual Currency", Retrieved at << http://conferences.sigcomm.org/sigcomm/2005/paper-IrwCha.pdf >>, Proceedings of the ACM SIGCOMM workshop on Economics of peer-to-peer systems, Aug. 22-26, 2005, pp. 1-6.

Khurana, Himanshu, "Scalable Security and Accounting Services for Content-based Publish/Subscribe Systems", Retrieved at << http://www.ncsa.illinois.edu/People/hkhurana/SAC05_2.pdf >>, Proceedings of the ACM symposium on Applied computing, Mar. 13-17, 2005, pp. 1-7.

Krishnamurthy, et al., "On the Leakage of Personally Identifiable Information via Online Social Networks", Retrieved at << http://ccr.sigcomm.org/online/files/p112-v40n1w-krishnamurthyPS.pdf >>, ACM SIGCOMM Computer Communication Review, vol. 40, No. I, Jan. 2010, pp. 112-117.

Machanavjjhala, et al., "I-diversity: Privacy Beyond k-Anonymity", Retrieved at << http://www.truststc.org/pubs/465/L%20Diversity%20Privacy.pdf >>, ACM Transactions on Knowledge Discovery from Data, vol. 1 No. 1, Mar. 2007, pp. 1-52.

"Memcached", Retrieved at << http://memcached.org/ >>, Retrieved Date : Mar. 1, 2011, pp. 1-3.

"OpenSSL", Retrieved at << http://www.openssl.org/ >>, Retrieved Date : Mar. 1, 2011, p. 1.

Opyrchal, et al., "Secure Distribution of Events in Content-based Publish Subscribe Systems", Retrieved at << http://citeseerx.ist.psu.edu/viewdoc/download;jsessionid=1DF5240E7006D71CC B556157399D7CA4?doi=10.1.1.137.7165&rep=rep1&type=pdf >>, Proceedings of the 10th USENIX Security Symposium, Aug. 13-17, 2001, pp. 1-16.

Peng, et al., "Large-scale Incremental Processing using Distributed Transactions and Notifications", Retrieved at << http://www.usenix.org/event/osdi10/tech/full_papers/Peng.pdf >>, Proceedings of the 9th USENIX conference on Operating systems design and implementation, 2010, pp. 1-14.

Pfitzmann, et al., "Anonymity, Unobservability, and Pseudonymity—A Proposal for Terminology", Retrieved at << http://ndanner.web.wesleyan.edu/research/arg/spring10/pfitzmann-kohntopp-2001a.pdf >>, Anonymity, 2000, pp. 1-9.

"Pi Calculus", Retrieved at << http://en.wikipedia.org/wiki/Pi calculus , Retrieved Date : Mar. 1, 2011, pp. 1-11.

PLANET LAB an open platform for developing, deploying, and accessing planetary-scale services, Retrieved at << "http://www.planet-lab.org/" >>, Retrieved Date : Mar. 1, 2011, p. 1.

"An Improved Algorithm for Computing Logarithms over GF(P) and its Cryptographic Significance", Retrieved at << http://ieeexplore.ieee.org/stamp/stamp.jsp?tp=&arnumber=1055817 >>, IEEE Transactions on Information Theory, vol. IT-24, No. 1, Jan. 1978, pp. 106-110.

Blanchet, et al., "Proverif", Retrieved at << http://www.proverif.ens.fr/ >>, Retrieved Date : Mar. 1, 2011, pp. 1-4.

Raiciu, et al., "Enabling Confidentiality in Content-basedlish/Subscribe Infrastructures", Retrieved at << http://eprints.ucl.ac.uk/4993/1/4993.pdf >>, IEEE Securecomm and Workshops, 2006, pp. 1-11.

Resnick, et al., "Reputation Systems", Retrieved at << http://presnick.people.si.umich.edu/papers/cacm00/reputations.pdf >>, Communications of the ACM, vol. 43 No. 12, Dec. 2000, pp. 1-7.

"RSA", Retrieved at << http://en.wikipedia.org/wiki/RSA >>, Retrieved Date : Mar. 1, 2011, pp. 1-11.

Shikfa, et al., "Privacy-preserving Content-based Publish/Subscribe Networks", Retrieved at << http://www.eurecom.fr/util/publidownload.fr.htm?id=2633 >>, IFIP Advances in Information and Communication Technology,vol. 297, 2009, pp. 1-14.

Singh, et al., "Policy-based Information Sharing in Publish/Subscribe Middleware", Retrieved at << http://thejoeshow.net/pdf/xml-stream/pubsub-info-sharing.pdf >>, IEEE Workshop on Policies for Distributed Systems and Networks, 2008, pp. 137-144.

Srivatsa, et al., "Secure Event Dissemination in Publish-subscribe Networks", Retrieved at << http://citeseerx.ist.psu.edu/viewdoc/download?doi=10.1.1.91.390&rep=rep1&type=pdf >>, 27th International Conference on Distributed Computing Systems, Jun. 25-27, 2007, pp. 1-22.

Sweeney, Latanya, "k-Anonymity: A Model for Protecting Privacy", Retrieved at << http://epic.org/privacy/reidentification/Sweeney_Article.pdf >>, International Journal of Uncertainty, Fuzziness and Knowledge-Based Systems, Vol. 10 No. 5, Oct. 2002, pp. 1-14.

(56) References Cited

OTHER PUBLICATIONS

Wang, et al., "Security Issues and Requirements for Internet-scale Publish-subscribe Systems", Retrieved at << http://citeseerx.ist.psu.edu/viewdoc/download?doi=10.1.1.131.6698&rep=rep1&type=pdf >>, Proceedings of the 35th Hawaii International Conference on System Sciences, 2002, pp. 1-8.

Wong, et al, "Secure Group Communications using Key Graphs", Retrieved at << http://ieeexplore.ieee.org/stamp/stamp.jsp?tp=&arnumber=836475 , IEEE/ACM Transactions Ok Networking,vol. 8, No. 1, Feb. 2000, pp. 16-30.

"WSJ-Article", Retrieved at << http://online.wsj.com/article/SB10001424052748704513104575256701215465596.html >>, May 21, 2010, pp. 1-4.

\* cited by examiner

FIG. 2

| User | Attribute |
|---|---|
| Alice | Red |
| Alice | Blue |
| Alice | Orange |
| Bob | Blue |
| Bob | Green |
| Bob | Orange |
| Charlie | Green |
| Charlie | Red |

FIG. 3

| User | Anon User | Anon UserAttr | Attribute |
|---|---|---|---|
| Alice | U1 | UA1 | Red |
| Alice | U1 | UA2 | Blue |
| Alice | U1 | UA3 | Orange |
| Bob | U2 | UA4 | Blue |
| Bob | U2 | UA5 | Green |
| Bob | U2 | UA6 | Orange |
| Charlie | U3 | UA7 | Green |
| Charlie | U3 | UA8 | Red |

| Data | Anon ID |
|---|---|
| Alice | U1 |
| Bob | U2 |
| Charlie | U3 |
| Red | UA1, UA8 |
| Blue | UA2, UA4 |
| Green | UA5, UA7 |
| Orange | UA3, UA6 |

FIG. 4

| Anon User | Anon UserAttr |
|---|---|
| U1 | UA1 |
| U1 | UA2 |
| U1 | UA3 |
| U2 | UA4 |
| U2 | UA5 |
| U2 | UA6 |
| U3 | UA7 |
| U3 | UA8 |

FIG. 5

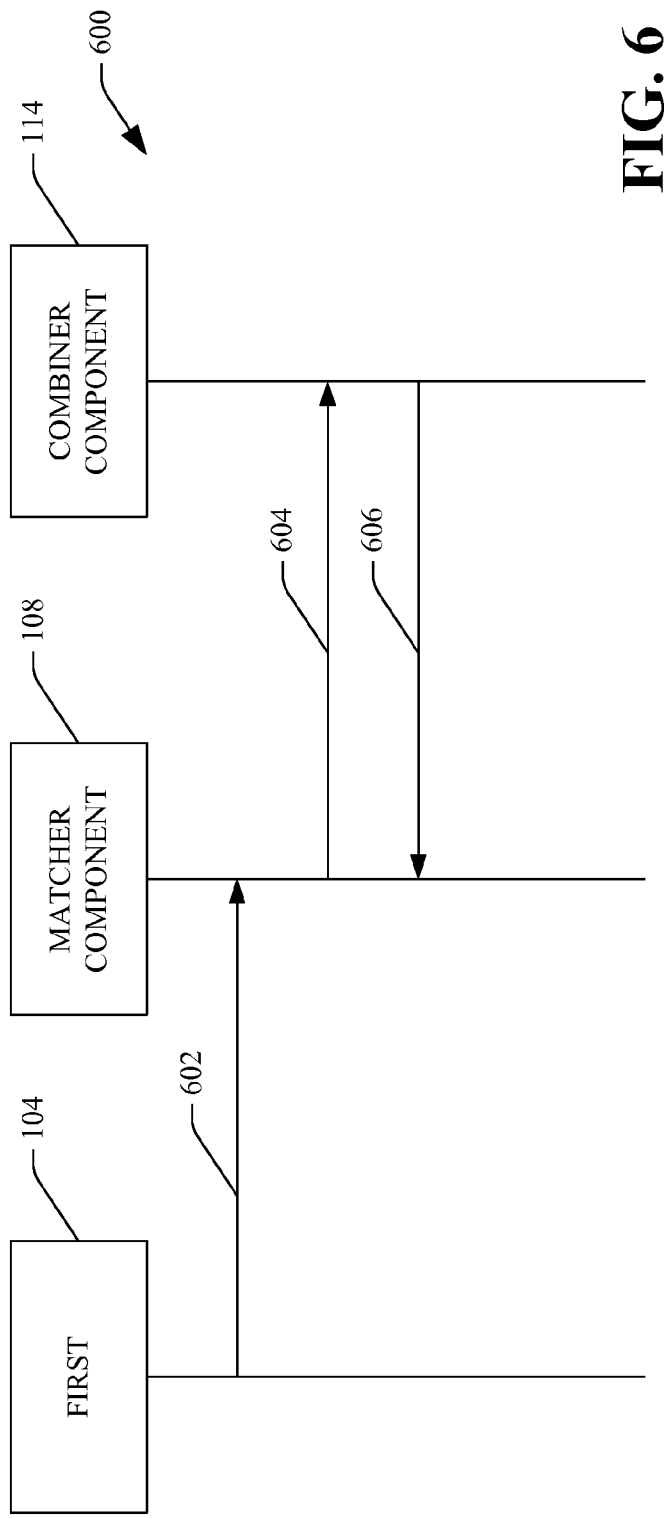

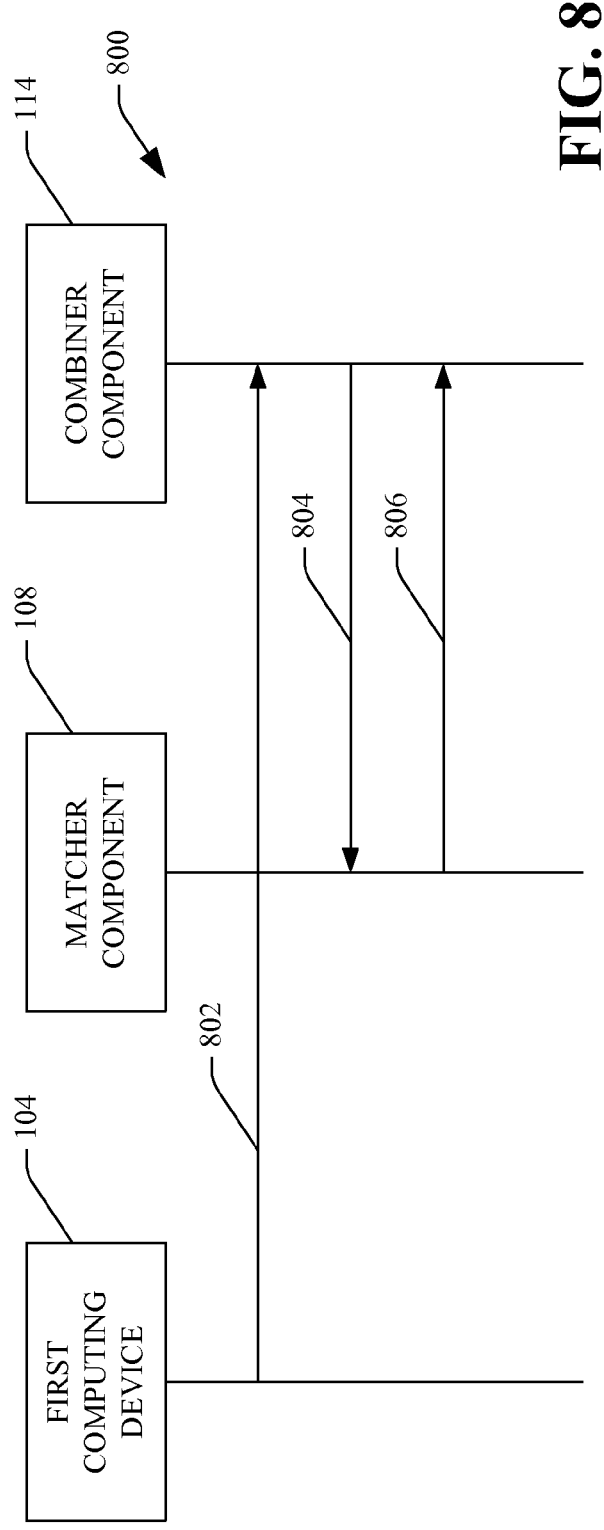

| From → To | Message | User Lookup | Combiner Processing |
|---|---|---|---|
| $C \to M$ | $p_i, \{A_j, n_j\}_k^C$ | | |
| $M \to U$ | $\{A_j, n_j\}_k^C$ | $A_j, n_j \mapsto a_j$ | |
| $U \to M$ | $\{a_j\}_k^C$ | | |
| $M \to C$ | $p_i, \{a_j\}_k^C$ | | $\text{CDecrypt}(\{\{(c_i)_k^C\}_m^C, k\}) \to \{c_i\}_m^C$ |
| $C \to M$ | $\vdots$ | | |
| $M \to U'$ | $p_i', \{\{(c_i')_k^C\}_m^C$ | | |
| $U' \to M$ | $\{c_i'\}_k^C$ | | |
| $M \to C$ | $p_i', \{\{(c_i')_k^C\}_m^C$ | | $\text{CDecrypt}(\{\{(c_i')_k^C\}_m^C, k'\}) \to \{c_i'\}_m^C$ |
| | | | $\text{CEncrypt}(\{c_i'\}_m^C, k) \to \{\{c_i'\}_k^C\}_m^C$ |
| $C \to M$ | $\vdots$ | | $\vdots$ |
| $M \to U'$ | $U', \{c_i\}_k^C$ | | |

PRIVACY-PRESERVING MATCHING SERVICE

BACKGROUND

Computer applications have been developed to perform attribute-based matching, where a first user is desirably matched with a second user or the first user is desirably provided with content based at least in part upon the matching of an attribute assigned to the first user. In other words, in attribute-based matching, there exists one or more attributes assigned to an entity (a user), and the goal is to find pairs or groups of entities that share the attributes. There are several variants of the matching problem depending on the entities being matched are (e.g., users versus businesses), the nature of the attributes (e.g., opaque strings versus semantically meaningful attributes, such as location), the nature of the association between the entities and their attributes (e.g., static versus dynamic, with the location of a mobile user being an example of the latter), and what constitutes a match (e.g., an exact match of opaque attributes versus approximate match of semantically meaningful attributes, with location proximity being an example of the latter).

Attribute-based matching is a primitive that is utilized in a wide range of applications. For instance, in a topic-based publish-subscribe system (such as a content broadcasting system or mailing list), a user can subscribe to topics of interest, and the user is notified when items matching the topics of interest are published. Another exemplary application type that utilizes attribute-based matching is a location-based application. In location-based applications, such as mobile advertising delivery, businesses publish information tagged with a target location. The information is then delivered to mobile users if and when their current location matches the target location. In online social networking applications, users are matched based upon their social relationship and interests that they have registered in profiles. Further, a location-based social networking application combines user-to-user matching with dynamically varying location attributes of users. For example, a first user can be notified when a registered contact of the first user is within a particular geographic range of the current location of the first user. Accordingly, the first and second user are matched based at least in part upon location attributes assigned thereto. In another example of an attribute-based matching service, places of interest can be suggested to users, where interests of the users and their current locations are matched with a place. A list of places can be provided by a third party mapping application, for instance.

While these matching-based applications are becoming increasingly popular, there are concerns regarding user privacy. Specifically, attributes that are assigned to a user may be sensitive to the user. For instance, being able to link a user with a location or interest in a particular health condition may reveal more about a user than the user would like. This privacy concern arises not only from the possibility of a third party learning the sensitive information, but also arises from the service provider (the matching service itself) learning or leaking information either deliberately or through carelessness.

SUMMARY

The following is a brief summary of subject matter that is described in greater detail herein. This summary is not intended to be limiting as to the scope of the claims.

Described herein are various technologies pertaining to performing attribute-based matching without allowing the service that performs the matching to learn of a link between an entity and an attribute. More particularly, a computer-implemented matching service can receive a request from a computer-executable application that desires to have an attribute-based match performed with respect to matching one or more entities, wherein the matching service performs a match based upon attributes assigned to the one or more entities or providing an entity with content based at least in part upon an attribute that is assigned to the entity. For instance, the computer implemented matching service can be a cloud-based service (public or private) that is configured to perform the attribute-based matching without learning associations between entities (users) and attributes. The matching service can also be configured to transmit a response to the request (to the first and/or second entity) that informs the first and/or second entity of the match without the matching service learning of the linkage between entities and attributes. Therefore, the matching service is treated as an untrusted service, such that the matching service is unable to ascertain linkages between data that would give rise to privacy concerns.

To provide the ability to perform attribute-based matching while anonymizing the linkage between entity identities and attributes, the matching service can include a plurality of partitions, wherein each partition includes a respective set of data that alone cannot be used to identify linkages between entity identities and attributes. When the sets of data are combined, however, attribute-based matching can be performed. In other words, user data (e.g., the association between the user and multiple attributes) is sharded such that shards of the data are individually exposed, thereby allowing rich matching, while the linkages between user identities and the attributes is protected. Pursuant to an example, the first partition in the matching service can include user identities as well as attributes, but does not include any linkages between user identities and attributes. A second partition can store linkages between obscured attributes and obscured (anonymized) identities. In other words, the second partition can retain pseudonyms for user identities retained in the first partition as well as linkages between the pseudonyms and obscured attributes.

After the matching service has performed the matching and transmitted a notification to one or more entities that are subject to a match, matching service can be configured to allow two matched entities to initiate a direct communication while the matching service acts as a mediator. In an example, the mediator (the matching service) is unable to intercept messages between two entities, and is further unable to identify either of the entities that desire to communicate directly with one another. Thus, the matching service provides an end to end solution, where an entity can register with the service while obscuring linkages between the entity and attributes of the entity. The matching service can perform attribute-based matching while being unable to ascertain linkages between entities and their attributes, and may further facilitate transmittal of a notification to an entity when a match has been identified without learning an identity of any party that is subject to the match. Furthermore, the matching service can mediate direct communications between matched entities without having knowledge of the identity of either of the entities that are directly communicating with one another.

Other aspects will be appreciated upon reading and understanding the attached figures and description.

BRIEF DESCRIPTION OF THE DRAWINGS

FIG. 2 is an exemplary table that illustrates users and their attributes.

FIG. 3 is an exemplary table that illustrates users, pseudonyms for the users, attributes assigned to the users, and corresponding obscured attribute identities.

FIG. 4 is an exemplary table that can be retained in a first partition of the attribute matching service.

FIG. 5 is an exemplary table that can be retained in a second partition of the attribute matching service.

FIG. 6 is a control flow diagram illustrates exemplary communications undertaken between a client computing device, a first partition in the attribute matching service, and a second partition in the attribute matching service in connection with registering a user with the attribute matching service.

FIG. 7 is an exemplary table that lists a formal description of communications between the client computing device, the first partition, and the second partition during registration of a user with the attribute matching service.

FIG. 8 is a control flow diagram that illustrates exemplary communications between the client computing device, the first partition, and the second partition of the attribute matching service when the attribute matching service is performing an attribute-based match.

FIG. 9 is a table that formally illustrates communications undertaken between the client computing device, the first partition, and the second partition of the attribute matching service in connection with the attribute matching service performing an attribute-based match.

FIG. 11 illustrates a table that formally presents communications undertaken between the first and second partitions in the attribute matching service and the client computing device when a notification is transmitted to the client computing device that an attribute-based match exists.

DETAILED DESCRIPTION

Figure 1:
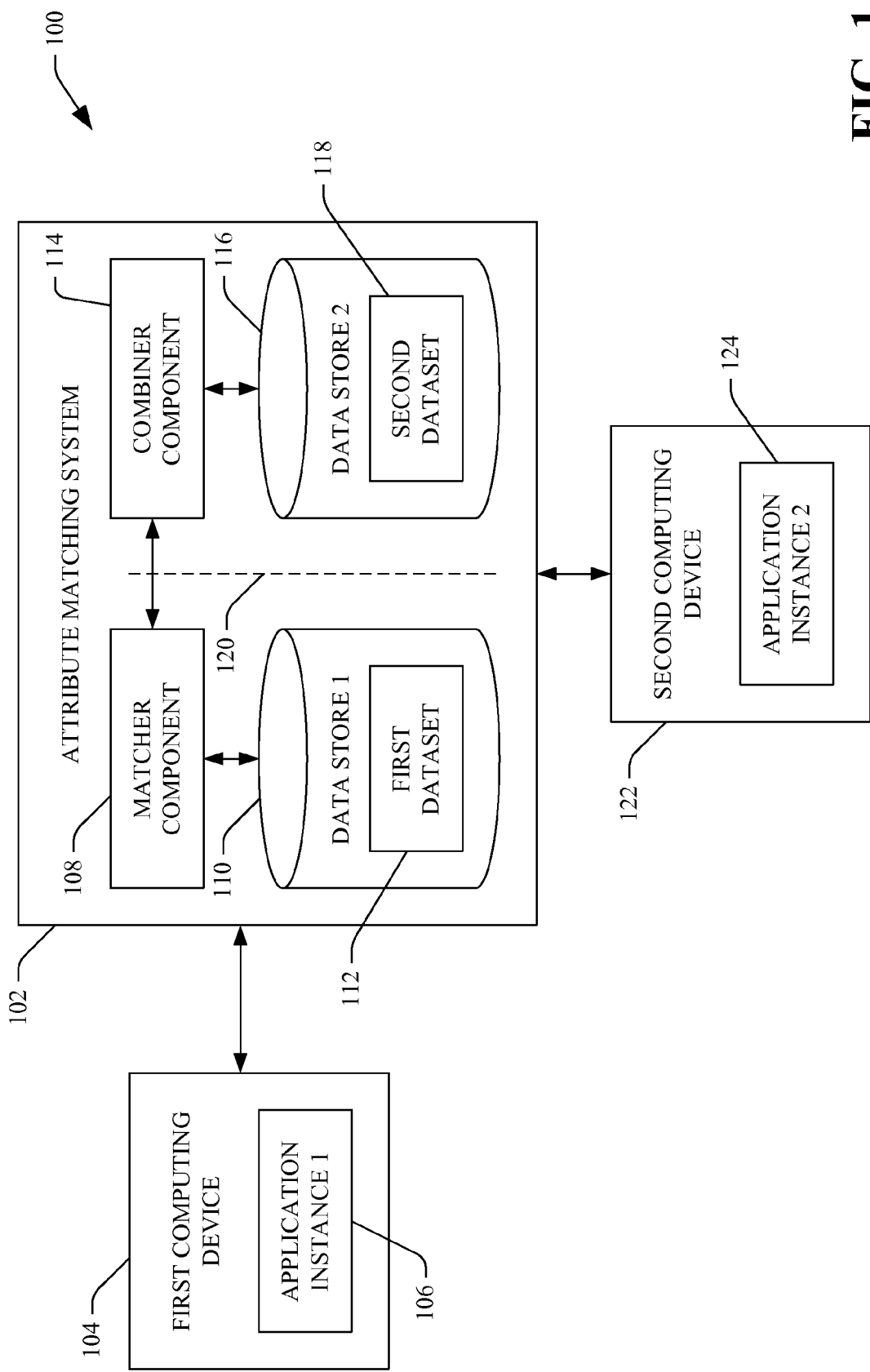
FIG. 1 is a functional block diagram of an exemplary attribute matching system that can perform attribute-based matching without learning of a linkage between entities and their registered attributes.

Various technologies pertaining to performing attribute-based matches will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. Additionally, the terms "component" and "system" are intended to encompass hardware that is designed to perform certain functionality, such as a field programmable gate array, a System on a Chip (SoC) architecture, and/or a Cluster on a Chip (CoC) architecture. The computer-executable instructions may include a routine, a function, or the like. It is also to be understood that a component or system may be localized on a single device or distributed across several devices.

With reference now to FIG. 1, an exemplary system 100 that facilitates performance of attribute-based matching without the system 100 learning a linkage between entities (users) and attributes of the users is illustrated. In other words, the system 100 is configured to perform attribute-based matching without the system 100 learning which entities are assigned which attributes. The system 100 comprises an attribute matching system 102 that is in communication with a first computing device 104. The first computing device 104 has a first application instance 106 executing thereon, wherein the first application instance 106 desirably provides services to the user of the first computing device 104 that are based upon at least one attribute-based match. As used herein, the term "attribute-based matching" is intended to encompass the matching of two entities (users) based upon attributes of the entities. "Attribute-based matching" is additionally intended to encompass the providing of content to a user when an attribute of the user matches a trigger. Examples of attribute-based matching include the matching of two users who are in geographic proximity to one another, wherein the attributes that are matched to pair such users are the locations of such users. In another example, the application instance 106 can desirably provide an article or broadcast to the user of the first computing device 104 when the article or broadcast published by an application is identified as pertaining to a topic that is of interest to the user of the first computing device 104 (here, the attribute is the topic of interest to the user, and the trigger is likewise the topic of interest to the user). In still yet another example, the first application instance 106 may be an instance of an application that provides the user of the first computing device 104 with an advertisement when the location of the user is within a predefined range of a location specified by an advertiser. Here, the attribute of the user (the dynamic location of the user) is matched with the location attribute set forth by the advertiser. If these attributes match, then the first application instance 106 desirably provides the user of the first computing device 104 with the advertisement. Various other types of attribute-based matching will be contemplated by one skilled in the art and are intended to fall under the scope of the hereto appended claims.

The attribute matching system 102 receives a request to perform an attribute-based match from the first instance of the application 106 executing on the first computing device 104. Pursuant to an example, the first computing device 104 may comprise an application that is configured to push content to a user if an attribute of the user matches a predefined attribute. For instance, the first instance of the application 106 may be configured to publish content to a user if an attribute of the user matches a topic of the content that is desirably pushed to the user. Thus, the first computing device 104 may be or include an application server, a client computing device, a mobile telephone, or the like. A request provided to the attribute matching system 102 is a request to perform an attribute-based match. The attribute matching system 102 can match users or match a user with content without learning linkages between users and attributes. Therefore, the attribute matching system 102 is treated as an untrusted party such that the attribute matching system 102 is unable to learn linkages between users and attributes of the users. Additionally, the attribute matching system 102 can transmit a signal to the first computing device 104 informing the first computing device 104 that a match has occurred based at least in part upon the request for an attribute-based match proffered by the first computing device 104, wherein the attribute matching system 102 can transmit the signal without learning any linkages between identities of entities (users) corresponding to the match and attributes thereof. Additionally, the relationship between entities and attributes is not learned by other entities (other users) that use the attribute matching system 102. Rather, only when a match is found and entities involved in the match are notified of which attributes the match is on and the entities consent to the match, does each matched user learn about the link between their counterpart's identity and their attributes.

This maintenance of user privacy is achieved through sharding data pertaining to entities across multiple, non-collaborating partitions of the attribute matching system 102. With more particularity, the attribute matching system 102 comprises a matcher component 108 that has access to a first data store 110. The first data store 110 comprises a first data set 112. The attribute matching system 102 additionally comprises a combiner component 114 that has access to a second data store 116 that comprises a second data set 118. The matcher component and the combiner component may also be referred to herein as the matcher and combiner, respectively. As shown, the matcher component 108 and the combiner component 114 can communicate with one another—that is, the matcher component 108 can transmit messages to the combiner component 114 and the combiner component 114 can transmit messages to the matcher component 108. However, the matcher component 108 is unable access the second data set 118 in the second data store 116, while the combiner component 114 is unable to access the first data set 112 in the first data store 110. Moreover, contents of the data stores 110 and 116 can be encrypted through utilization of keys that are known only to the matcher component 108 and the combiner component 114, respectively. In other words, the matcher component 108 and the first data store 110 can be considered as a first partition of the attribute matching system 102 while the combiner component 114 and the second data store 116 can be considered as a second partition of the attribute matching system 102. It is to be understood that other partitions may be added to the attribute matching system 102 without deviating from the scope of the claims. Through sharding of data between the first partition and the second partition, the attribute matching system 102 can perform rich attribute-based matching while user privacy is preserved.

As will be described in greater detail below, users can register with the attribute matching system 102, wherein the registration process does not allow for either the matcher component 108 or the combiner component 114 to have access to data that allows either of such components 108 or 114 to ascertain linkages between user identities and attributes of users. Accordingly, the matcher component 108 and the combiner component 114 are assumed to be non-colluding. In broad terms, the matcher component 108 can have knowledge about user identities and the attributes but have no knowledge about linkages between the users and the attributes. Conversely, the combiner component 114 can have knowledge about associations between users and attributes, but does not have knowledge of actual user identities or actual attribute values (these are anonymized or otherwise obscured). A protocol that defines communications between the matcher component 108 and the combiner component 114 allows such components 108 and 114 to act in conjunction to perform attribute-based matching, without either of the matcher component 108 or the combiner component 114 learning about linkages between user identities and their attributes.

In an example, during registration, a user can present the attribute matching system 102 with an identity of the user, as well as attributes of the user. Various encryption schemes can be utilized in connection with providing the attribute matching system 102 with this information, thereby preventing either the matcher component 108 or the combiner component 114 to learn linkages between the user identity and her attributes. The user identity and the attributes can be retained in the first data set 112 without any linkages between the user identity and her attributes. Therefore, the first data set 112 can include a plurality of user identities and a plurality of attributes with no relation between any one user identity and any other attribute. The second data set 118 in the second data store 116 can retain linkages between anonymized user identities and obscured attributes. Therefore, the second data set 118 includes information that anonymously identifies a user, an obscured attribute, and a linkage that indicates that the obscured attribute belongs to the anonymized user. The second data set 118, however, includes no information as to actual user identities or actual attributes. Thus, when the matcher component 108 and the first data store 110 are separated from the combiner component 114 and the second data store 116 (as shown by partition line 120), the attribute matching system 102 is unable to determine which users have certain attributes. As will be shown and described below, however, the attribute matching system 102 can perform attribute-based matching such that users can be matched based upon one or more attributes assigned to at least one of such users and/or a user can be provided with content based at least in part upon an attribute of the user.

A second computing device 122 may be in communication with the attribute matching system 102 and can receive a transmitted notification from the attribute matching system 102 that a second user of the second computing device 122 has been subjected to a match. More specifically, the second computing device 122 can include a second instance of the application 124 (similar to the first instance of the application 106 executing on the first computing device 104). Therefore, the user of the second computing device 122 may also have registered with the attribute matching system 102, such that the identity of the second user and her attributes are retained in the first data set 112 but not linked and an anonymized identifier for the second user and obscured attributes with linkages are included in the second data set 118. The matcher component 108 and the combiner component 114 can operate in conjunction to perform attribute-based matching based at least in part upon matching attributes of the first user of the first computing device 104 and the second user of the second computing device 122. The attribute matching system 102 may then transmit notifications to both the first computing device 104 and the second computing device 122 to inform the users of such computing devices 104 and 122 that their attributes have been matched.

In some instances, the user of the first computing device 104 and user of the second computing device 122 may wish to communicate directly with each other. The attribute matching system 102 can act as a mediator for communications between the first computing device 104 and the second computing device 122, wherein the attribute matching system 102 can cause messages to be transmitted between the users of the computing devices 104 and 122 without having knowledge of the existence of a match between the users of the computing devices 104 and 122, respectively.

In another exemplary embodiment, the attribute matching system 102 may further comprise an advertiser component (not shown) that is in communication with the matcher component 108 and the combiner component 114. The advertiser component is configured to transmit an advertisement to one of the first computing device 104 or the second computing device 122 when an attribute of users of the computing devices 104 and 122 (such as geographic location) matches a predefined trigger. The attribute matching system 102 can cause a match to be performed without learning the linkages between user identities and attributes of the users of the client computing devices 104 and 122, and the advertiser component can cause an advertisement to be transmitted to the appropriate computing device 104 or 122 without having knowledge of the existence of an attribute-based match. Therefore, the advertiser component may have knowledge that a certain specified attribute has been matched, but will not have knowledge of the identity of the user who has that attribute.

The attribute matching system 102 can perform attribute-based matching efficiently, wherein performing matching efficiently can be defined as performing attribute-based matching while incurring constant computational overhead regardless of sizes of the first dataset 112 and the second dataset 118.

With reference briefly to FIG. 2, an exemplary table 200 that illustrates users and attributes of users is illustrated. Each user in the table 200 is tagged with a color. For instance, the user Alice is tagged with the colors red, blue and orange. The attribute matching system 102, for example, can be requested (e.g., by the first instance of the application 106) to match users with the most colors in common. In this example, Alice would be matched with Bob, since Alice and Bob share two colors in common as opposed with Charlie, who shares one color with each of Alice and Bob. As indicated above, it is desired that the attribute matching service 102 be unable to learn which users have which attributes. Additionally, other users of the attribute matching system 102 should also not be able to ascertain which users have which attributes.

The attribute matching system 102 accomplishes this goal by sharding data shown in the table 200 between the non-colluding partitions, wherein a first partition includes the matcher component 108 and the first data store 110 and the second partition includes the combiner component 114 and the second data store 116. The matcher component 108 is configured to match attributes without knowledge of to whom the attributes belong. The combiner component 114 is configured to count matched attributes for a pair of pseudo-anonymous users without knowledge of the actual attributes or user identities. In an example, encryption can be employed to prevent the combiner component 114 from obtaining unobscured attributes. The matcher component 108 can prevent the combiner component 114 from learning identities of users, and the combiner component 114 can prevent the matcher component 108 from learning which attribute is associated with which user. To that end, the attribute matching system 102 can first associate an anonymous user identifier with each user and an anonymous identifier for each user attribute pair.

Referring briefly to FIG. 3, an exemplary table 300 that illustrates the assignation of an anonymous identifier for each user attribute pair is illustrated. In an example, Alice is assigned the anonymous user identifier U1, and the user attribute pair of Alice and red is assigned the anonymous identifier UA1. Similarly, the user Bob is assigned the anonymous user identifier U2, and the user attribute pair of Bob and blue is assigned the anonymous identifier UA4. It is to be noted that the table 300 shown in FIG. 3 is not constructed by the attribute matching system 102, but is presented for purposes of explanation. In actuality, the logical table 300 shown in FIG. 3 is sharded such that portions thereof are selectively placed in the first data store 110 and the second data store 116, respectively.

Referring to FIG. 4, an exemplary table 400 that can be included in the first data store 110 as at least a portion of the first data set 112 is illustrated. It can thus be ascertained that the matcher component 108 is unable to analyze the table 400 to ascertain that, for instance, Alice is tagged with the attribute red or whether there even exists a user that is tagged with the attributes red, blue and orange.

Turning to FIG. 5, an exemplary table 500 that can be retained in the second data store 116 as at least a portion of the second data set 118 is illustrated. Thus, the combiner 114 has access to pseudonyms and obscured user-attribute pairs, but is unable to ascertain the identity of the users or which user attributes are associated with a user. Therefore, neither the matcher component 108 nor the combiner component 114 can individually learn which users are assigned which attributes.

Returning to FIG. 1, the attribute matching system 102 can locate a best match with respect to the tables 400 and 500 as follows: matching can be initiated when a user of the first computing device 104 polls the attribute matching system 102. To find a match for U1, the combiner component 114 requests from the matcher component 108 all anonymous user-attribute pair identifiers with the same tag as UA1. The matcher component 108 searches for UA1 in the table 400, and responds with UA8 (since both UA1 and UA8 share the attribute red). The combiner component 114 maps UA8 back to the anonymous user U3. The combiner component 114 repeats the process for UA2 and UA3 separately, receives UA4 and UA6, respectively, from the matcher component 108, and maps them back to U2 in each case. The combiner component 114 may then conclude that user U1 matches U2 on two attributes and U3 on one attribute (without ever knowing who the users are or what the attributes are).

It can be noted that the attribute matching system 102 can support arbitrary matching algorithms at the matcher component 108. That is, in addition to performing an equality match, the attribute matching system 102 can perform semantic matches (e.g., proximity for location/geographic attributes, spell correction, multilingual matching, price-based comparisons (e.g., the term "cheap pizza" matches "$3 pizza"), etc.). This is because the matcher component 108 has access to the actual attribute string, rather than a hash or an encryption of an attribute string. In other words, the first computing device 104 can encode rich attributes during registration of a user, wherein such rich attributes are in a format understood by the matcher component 108, and the matcher component 108 can utilize any suitable matching algorithm to perform an attribute-based match. Pursuant to a particular example, the application instance 106 can provide its own matching algorithm that can be employed by the matcher component 108 in connection with performing a match. This algorithm may be executed in a sandbox that is provided by the attribute matching system 102. If the functionality of the first application instance 106 requires only matching users with content, the matched content can be transmitted to the first computing device 104 by way of the matcher component 108 in a straightforward manner. In another example, a link to the content can be securely transmitted (similar to the manner that an identity of a user is transmitted in a matched users case).

If, instead, the first application instance 106 requires initiating direct communication between two matched users, a privacy preserving notification protocol can be conducted by the attribute matching system 102 as follows: the combiner component 114 can direct the matcher component 108 to notify the user behind U1 (Alice) that a match has been found, without revealing U2 being the match. Alice responds with (encrypted) information needed to initiate direct contact. The matcher component 108 anonymizes the source (to U1) and forwards the message to the combiner component 114. Similarly, the combiner component 114 can direct the matcher component 108 to notify user U2 of the match (without revealing U1 to be the match), and the matcher component 108 can receive Bob's (encrypted) contact information in parallel, anonymize to user U2, and forward the message to the combiner component 114. Once the combiner component 114 receives both messages, the encrypted contact information is transmitted by the matcher component 108 to the other user. It can be ascertained that the attribute matching system 102 does not require a public key infrastructure but instead can use commutative cryptography such that in the above exchange, no party except the matched users (neither the matcher component 108 nor the combiner component 114 nor anyone else) learns which users were paired. Furthermore, if either user declines the match, not even the users learn who they had been matched with.

With reference now to FIG. 6, an exemplary control flow diagram 600 that illustrates communications undertaken between the client computing device 104, the matcher component 108, and the combiner component 114 during registration of a user with the attribute matching system 102 is illustrated. Prior to describing such communications, several preliminary definitions are provided. A "randomized encryption scheme" comprises an encryption algorithm (REncrypt) and a decryption algorithm (RDecrypt) such that an encrypted message, REncrypt(m, pk) is not susceptible to a dictionary attack (on message m) even if the adversary has public key pk. This is typically constructed from an existing encryption scheme such as RSA by salting the message with a random nonce before encryption (in REncrypt) and discarding the nonce after decryption (in RDecrypt).

A "commutative encryption scheme" comprises algorithms CEncrypt and CDecrypt that have the special property that CEncrypt(CEncrypt ((m, $k_1$), $k_2$) equals CEncrypt(CEncrypt (m, $k_2$), $k_1$). That is, a message m, twice encrypted with keys $k_1$ and $k_2$ in any order, can be decrypted with either key first, to reveal the message encrypted with the other key. An example of asymmetric key commutative encryption system is XORing the message with a key stream, where (m ⊕ $k_1$) ⊕$k_2$=(m ⊕ $k_2$) ⊕ $k_1$.

"Scaling out" refers to a paradigm that aims to increase system throughput by scaling out computation to a large number of relatively inexpensive commodity servers, rather than scaling up individual server performance on relatively expensive hardware. Scale out architectures typically avoid storing session state across requests so that any server can process any request, and when session state is necessary either route the request to a designated server for that session or use large distributed in memory caches to store session state.

Registration of a user of the client computing device 104 with the attribute matching system 102 is now described. The goal of registration is to create datasets in the first data store 110 and the second data store 116 that have formats of (or substantially similar to) the table 400 and the table 500 shown in FIGS. 4 and 5, respectively.

Still referring to FIG. 6, the client computing device 104 encrypts an attribute (a) first with a public key of the matcher component 108 (M) and then with a public key (C) of the combiner component 114. This double-encrypted attribute together with the identity of the user (U) is transmitted from the first computing device 104 to the matcher component 108 at 602. Randomized encryption can be utilized by the first computing device 104 to defend against dictionary attacks. Additionally, the first computing device 104 can include a pseudo random nonce (n) and a key (k) that is encrypted by the public key (C) of the combiner component 114. The pseudo-random nonce and the key can be used by the combiner component 114 in a notification protocol that will be described herein to securely inform the first computing device 104 which attributes were matched. To this end, the first computing device 104 can maintain a mapping ($A_U$) between the nonce and the attribute.

The matcher component 108 uses a consistent mapping between the user U and a pseudo-random user pseudonym (p stored in $U_M$) such that all registrations from the same user use the same user pseudonym. The matcher component 108 can forward the message received from the first computing device 104 to the combiner component 114 at 604, after replacing the user identity (U) with the user pseudonym (p). After receiving this message, the combiner component 114 can decrypt the contents to learn the key k. The combiner component 114 may then store a mapping ($K_p$) from the user to the key for later use in the notification protocol. If a mapping previously exists (from another registration), the combiner component 114 can ensure that the keys match, thereby ensuring all registrations from a given user pseudonym were created by the same (anonymous) entity. Otherwise, if the keys do not match, the message is ignored.

The combiner component 114 may then create a pseudo-random user attribute pair identifier (q) for the registration. It can be noted that this identifier q is opaque, so it does not reveal anything about either the user or the attribute represented by the pair. The combiner component 114 transmits the user attribute pair identifier q and the encrypted attribute (which had been encrypted by the user with the public key of the matcher M) to the matcher component 108.

The matcher component 108 can then decrypt the message to recover the attribute (a). The matcher component 108 can then update its mapping (table $Q_M$) from the attribute to all registered user attribute pair identifiers, and the reverse mapping table (table $A_M$) from user attribute pair identifier to the attribute.

The combiner component 114 can also store mappings that allow the combiner component 114 to retrieve the user pseudonym given the user attribute pair identifier, and the user attribute pair identifier(s) given the user pseudonym. Table $P_C$ maps between the user attribute pair identifier and the user pseudonym/nonce tuple (p, n) for the registration, and the reverse mapping (Table $Q_C$) maps the user pseudonym to all user attribute pair identifiers and nonces registered.

Referring briefly to FIG. 7, a table 700 illustrates a registration protocol formally.

With reference now to FIG. 8, an exemplary control flow diagram 800 that illustrates communications undertaken between the first computing device 104, the matcher component 108, and the combiner component 114 when a match is undertaken by the attribute matching system 102 is illustrated.

At 802, the first computing device 104 polls the combiner component 114, thereby initiating the matching protocol. The combiner component 114 can notify the matcher component 108 of such polling, or alternatively the matcher component 108 can directly receive the polling notification from the first computing device 104. In any event, the matcher component 108 can access the anonymous identifier for the user of the first computing device 104 and can transmit the anonymous identifier to the combiner component 114 at 804. The combiner component 114 may then retrieve from Table $Q_C$ the set ($\{q_i\}$) of user-attribute pair identifiers registered by the user. The following two message protocol can be individually executed for each $q_i$. First at 806, the combiner component 114 can transmit a user-attribute identifier pair $q_i$ to the matcher component 108. The matcher component 108 can query Table $A_M$ to retrieve the attribute (a) associated with that identifier during registration. The matcher component 114 can then query Table $Q_M$ for all other user-attribute pair identifiers ($\{q_j'\}$) associated with that attribute.

At 808, the matcher component 108 transmits the set ($\{q_j'\}$) to the combiner component 114 in response to the query from the combiner component 114. For each $q_j'$, the combiner component 114 queries Table $P_C$ to retrieve the user pseudonym p' associated with that user-attribute pair identifier.

Accordingly, for each user attribute pair $q_i$ corresponding to an attribute registered by the pseudo user p, the combiner learns a set $\{p_j'\}$ of other pseudo-users that match p on that one attribute. The combiner component 114 can aggregate these result sets to pick pseudo-users that match p. The combiner component 114 can use rich criteria to pick p'. An exemplary criteria is that p' appears in more than some threshold number of result sets.

Referring briefly to FIG. 9, a Table 900 that formally illustrates the protocol undertaken between the matcher component 108 and the combiner component 114 when performing a match is shown.

Figure 10:
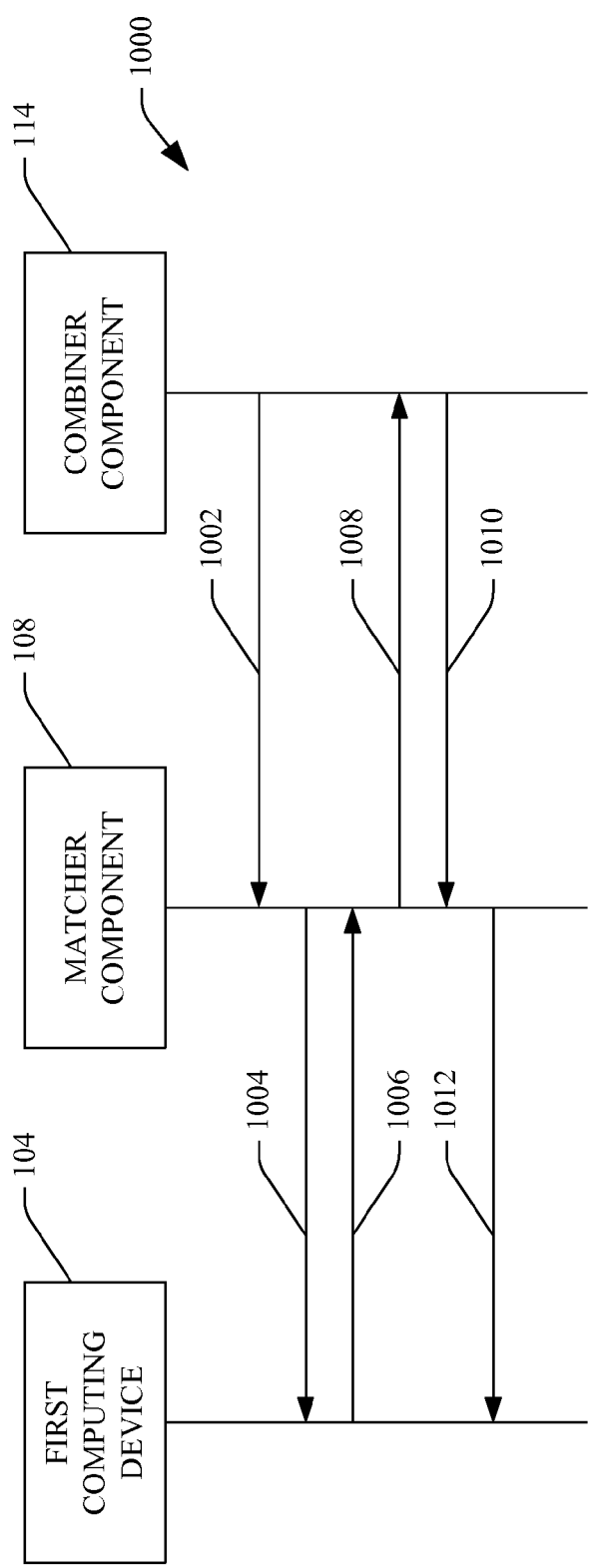
FIG. 10 is a control flow diagram that illustrates exemplary communications undertaken between a client computing device, the first partition, and the second partition of the attribute matching service in connection with transmitting a notification to the client computing device that an attribute-based match exists.

Turning now to FIG. 10, an exemplary control flow diagram 1000 that illustrates communications undertaken between the first computing device 104, the matcher component 108, and the combiner component 114 in connection with transmitting a notification to the first computing device 104 with respect to an attribute-based match pertaining to the user of the first computing device 104 is illustrated.

The notification protocol displayed in FIG. 10 has two goals: the first goal is to notify the user of an attribute-based match. In the case of a user to user match, the second goal is to facilitate direct communication between the two users by exchanging one set of messages between them. The constraint is that neither the matcher component 108 nor the combiner component 114 (nor the users if either user declines the match) must learn which users were paired up.

Notification can be initiated by the combiner component 114 at the conclusion of the matching protocol described previously. Given pseudo users p and p' that are matched with each other on user attribute pair identifiers $q_i$ for p and $q_i'$ for p' known from message M2, the combiner component 114 can query table $P_C$ for the nonces $\{n_i\}$ for p and $n_i'$ for p'. The combiner component 114 can encrypt the nonce sets with keys k and k', respectively, from table $K_C$ of user key mappings. At 1002, the combiner component 114 can transmit the first encrypted nonce set to the matcher component 108 requesting the matcher component 108 to forward the notification to pseudo user P. In a separate message (e.g., message N1'), the combiner component 114 can send the second encrypted nonce set to pseudo user p" by way of the matcher component 108. The introduction of mix-like delays ensures that the matcher component 108 is unable to link the messages and thereby learn that pseudo-users p and p' have been matched. The notification protocol is symmetric for both users and in the remainder of this description, only p is referred to.

The matcher component 108 maps pseudo user P to the real user U using Table $U_M$ and forwards the message to user U (transmits the message at 1004 to the first computing device 104). Upon receiving the message, U decrypts the set of nonces (using k) and maps each nonce $n_i$ to the attribute $a_i$ the nonce was associated with during registration (using $A_U$). Accordingly, U learns the attributes on which a match has been found. Based on this knowledge, the application executing on the first computing device 104 can decide, possibly after seeking user input, whether or not to initiate direct communication. If the application chooses not to initiate contact, the protocol can be terminated at this point.

If the application chooses to initiate contact, then the application can encrypt U's contact information (ci) using commutative encryption under key k. The client computing device 104 may then send the encrypted message to the matcher component 108 at 1006.

The matcher component 108 further encrypts the message using key m (known only to the matcher component 108) using commutative encryption. The matcher component 108 then forwards the message to the combiner component 114 at 1008 after replacing U's identity with its pseudo-identity p.

On receiving such message, the combiner component 114 decrypts the double encrypted message using k to reveal p's contact information single-encrypted by the key of the matcher component 108 (which is a property of commutative encryption). In parallel, the combiner component 114 can similarly acquire encrypted contact information for p'. The combiner component 114 further encrypts encrypted contact information for p' with k and at 1010, transmits the encrypted contact information to the matcher component 108 to forward to the pseudo user p.

The matcher component 108 decrypts the double encrypted contact information to reveal contact information for p' single encrypted by k. The matcher component 108 transmits this information to the first computing device 104 at 1012. On receiving the message, the client computing device 104 decrypts it with k and retrieves the matched user's contact information ci'. In parallel, user U' similarly receives ci. At this point, the matched users may initiate direct communication external to the attribute matching system 102.

Referring briefly to FIG. 11, a Table 1100 that presents a formal description of a notification protocol that can be undertaken between the client computing device 104, the matcher component 108, and the combiner component 114 is shown.

Figure 12:
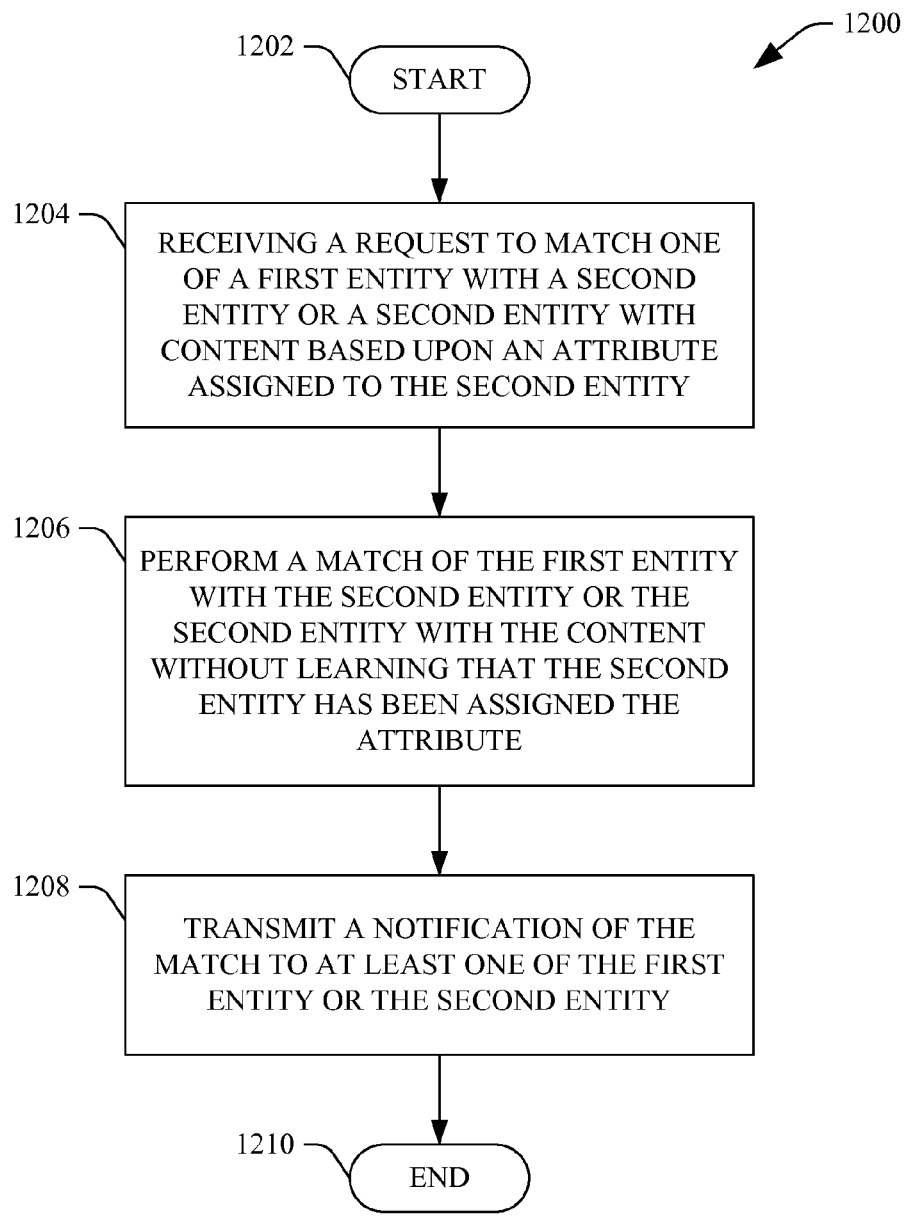
FIG. 12 is a flow diagram that illustrates an exemplary methodology for transmitting a notification of a match to at least one of a first entity or a second entity without an attribute matching service learning of a linkage between the first entity or the second entity and the attribute.

With reference now to FIG. 12, an exemplary methodology is illustrated and described. While the methodology is described as being a series of acts that are performed in a sequence, it is to be understood that the methodology is not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagating signal.

With reference now to FIG. 12, an exemplary methodology 1200 that facilitates performing an attribute-based match without learning attributes of users when performing the match is illustrated. The methodology 1200 starts at 1202, and at 1204 a request is received to match one of a first entity with a second entity or the second entity with content based upon an attribute of the second entity (as well as possibly an attribute of the first entity).

At 1206, a match of the first entity with the second entity or the second entity with the content is performed without learning that the second entity has the attribute. Thus, the attribute matching system is untrusted and does not learn mappings between user identities and attributes when performing attribute-based matchings. At 1208, a notification is transmitted to the at least one of the first entity or the second entity to indicate that the first entity is matched with the second entity or that the second entity is to receive the content. The methodology 1200 completes at 1210.

Figure 13:
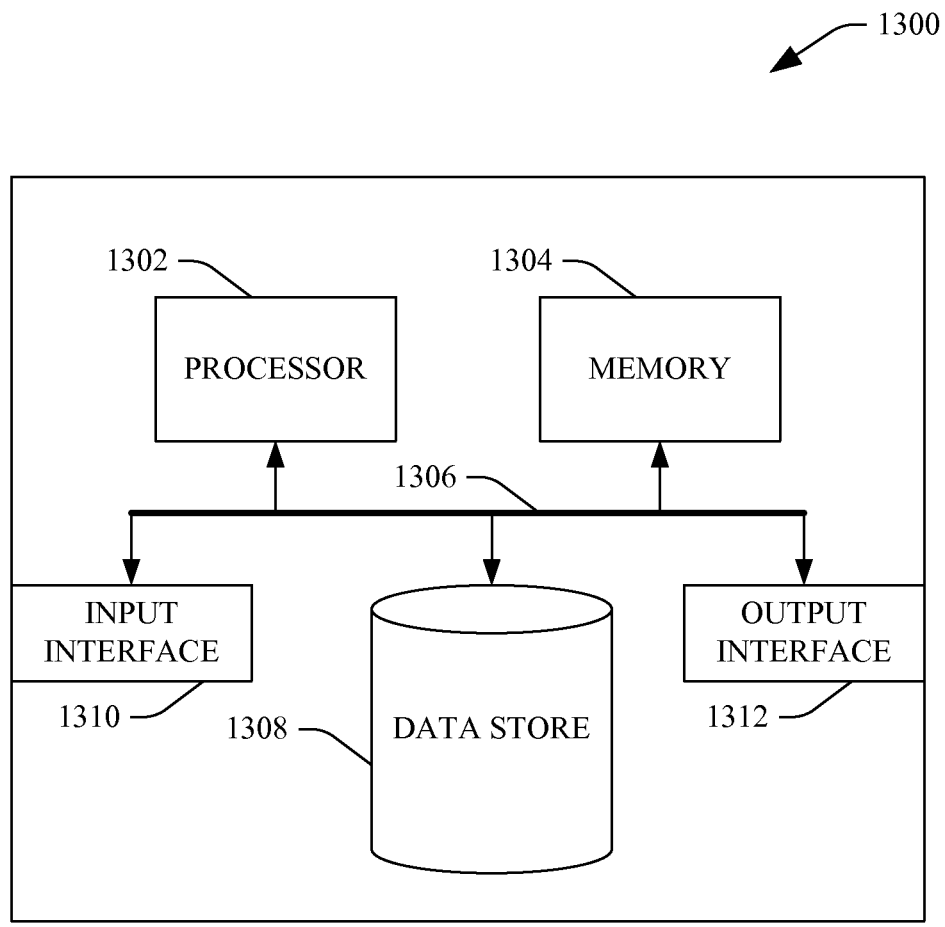
FIG. 13 is an exemplary computing system.

Now referring to FIG. 13, a high-level illustration of an exemplary computing device 1300 that can be used in accordance with the systems and methodologies disclosed herein is illustrated. For instance, the computing device 1300 may be used in a system that supports registering users and attributes with an attribute matching system. In another example, at least a portion of the computing device 1300 may be used in a system that supports performing an attribute-based match without learning mappings between users and their attributes. The computing device 1300 includes at least one processor 1302 that executes instructions that are stored in a memory 1304. The memory 1304 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1302 may access the memory 1304 by way of a system bus 1306. In addition to storing executable instructions, the memory 1304 may also store attributes, user identities, pseudonyms for users, obscured attributes, encryption keys, etc.

The computing device 1300 additionally includes a data store 1308 that is accessible by the processor 1302 by way of the system bus 1306. The data store 1308 may be or include any suitable computer-readable storage, including a hard disk, memory, etc. The data store 1308 may include executable instructions, attributes, users, pseudonyms, etc. The computing device 1300 also includes an input interface 1310 that allows external devices to communicate with the computing device 1300. For instance, the input interface 1310 may be used to receive instructions from an external computer device, a user, etc. The computing device 1300 also includes an output interface 1312 that interfaces the computing device 1300 with one or more external devices. For example, the computing device 1300 may display text, images, etc. by way of the output interface 1312.

Additionally, while illustrated as a single system, it is to be understood that the computing device 1300 may be a distributed system. Thus, for instance, several devices may be in communication by way of a network connection and may collectively perform tasks described as being performed by the computing device 1300.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising:
at a first computing partition, performing a first plurality of acts, the first plurality of acts comprising:
receiving a request from a computer-executable application to match a first entity with a second entity based upon an attribute of the first entity, the request comprising a first anonymous identifier of the first entity;
responsive to receiving the request, searching a first dataset based upon the first anonymous identifier;
based upon the searching of the first dataset, identifying a first obscured linkage that represents that the first entity represented by the first anonymous identifier has a first attribute, wherein the first computing partition is unable to ascertain that the first anonymous identifier represents the first entity or that the first attribute is the attribute; and
transmitting the obscured linkage to a second computing partition;
at the second computing partition, performing a second plurality of acts, the second plurality of acts comprising:
receiving the obscured linkage from the first computing partition;
responsive to receiving the obscured linkage from the first computing partition, searching a second dataset based upon the first obscured linkage;
based upon the searching of the second dataset, identifying the attribute represented by the obscured linkage;
responsive to identifying the attribute represented by the obscured linkage, searching the second dataset based upon the attribute;
based upon the searching of the second dataset, identifying a second obscured linkage, wherein the second computing partition is unable to ascertain an identity of an entity that has the attribute based upon the second obscured linkage; and
transmitting the second obscured linkage to the first computing partition;
at the first computing partition, performing a third plurality of acts, the third plurality of acts comprising:
receiving the second obscured linkage from the second computing partition;
responsive to receiving the second obscured linkage, searching the first dataset using the second obscured linkage; and
based upon the searching of the first dataset using the second obscured linkage, identifying a second anonymous identifier that represents the second entity, the first computing partition unable to ascertain that the second anonymous identifier represents the second entity or that the second entity has the attribute;
transmitting a signal to the computer-executable application that indicates that the first entity is matched with the second entity.

2. The method of claim 1, wherein the computer-executable application is a client-side application that is in network communication with the computer-implemented matching service.

3. The method of claim 1, wherein the first partition is unable to decrypt content of the second dataset, and the second partition is unable to decrypt contents of the first dataset.

4. The method of claim 3, further comprising:
registering the second entity with the computer-implemented matching service.

5. The method of claim 4, wherein registering the second entity with the computer-implemented matching service comprises selectively transmitting data from the first partition to the second partition such that the first partition and the second partition are unable to map the second entity to attributes of the second entity.

6. The method of claim 5, wherein transmitting the signal to the computer-executable application comprises transmitting the signal to the computer-executable application only if the second entity consents to the transmitting of the signal.

7. The method of claim 6, wherein transmitting the signal to the computer-executable application comprises transmitting the signal such that the computer-implemented matching service fails to learn that the second entity has been matched to the first entity or that the second entity has the attribute.

8. The method of claim 1, wherein the computer-implemented matching service is a cloud-based service that is distributed across several computing devices.

9. The method of claim 1, wherein the computer-implemented matching service utilizes a matching algorithm provided by the computer-executable application to perform the matching of the first entity with the second entity without learning that the second entity has the attribute.

10. The method of claim 9, wherein the matching of the first entity with the second entity is undertaken through a semantic match.

11. An attribute-based matching system, comprising:
a first computing partition, the first computing partition comprising:
a first dataset that comprises:
a first anonymous identifier that represents a first entity;
a second anonymous identifier that represents a second entity;
a first obscured linkage that corresponds to the first anonymous identifier,
the first obscured linkage representative of a first entity-attribute pair; and
a second obscured linkage that corresponds to the second anonymous identifier, the second obscured linkage representative of a second entity-attribute pair; and
a combiner component that has access to the first dataset, the combiner component unable to determine an identity of the first entity, an identity of the second entity, or identities of attributes of the entity-attribute pairs based upon the first dataset; and
a second computing partition, the second computing partition comprising:
a second dataset that comprises:
an attribute identity;
the first obscured linkage; and
the second obscured linkage, the first obscured linkage and the second obscured linkage stored in the second dataset in relation to the attribute identity; and
a matcher component that has access to the second dataset, the matcher component unable to determine identities of entities of the entity-attribute pairs based upon the second dataset, wherein the combiner component and the matcher component operate in conjunction to transmit a signal to a computing device of at least one of the first entity or the second entity to indicate that the first entity and the second entity have the attribute.

12. The attribute-based matching system of claim 11, wherein the matcher component is unable to access the first dataset and the combiner component is unable to access the second dataset.

13. The attribute-based matching system of claim 12, wherein the matcher component is unable to decrypt the first dataset and the combiner component is unable to decrypt the second dataset.

14. The attribute-based matching system of claim 13, wherein the matcher component and the combiner component act in conjunction when the first entity registers with the system to shard data received from the first entity amongst the first data store and the second data store without learning attributes of the first entity.

15. The attribute-based matching system of claim 14, wherein the data received from the first entity is encrypted such that neither the matcher component nor the combiner component are able to ascertain the attributes of the first entity upon receipt of the data from the first entity.

16. The attribute-based matching system of claim 11, wherein the first entity is an individual.

17. The attribute-based matching system of claim 11, wherein the matcher component and the combiner component act in conjunction to transmit a notification to the first entity informing the first entity that the second entity has the attribute without either the matcher component or the combiner component learning the attribute of the first entity.

18. The attribute-based matching system of claim 17, wherein the attribute-based match matches the first entity with the second entity, and wherein the matcher component and the combiner component act in conjunction to notify both the first entity and the second entity of the match without either the matcher component or the combiner component learning that the first entity and the second entity have been matched.

19. The system of claim 11, wherein the combiner component receives a request to perform an attribute-based match, the request comprising the first anonymous identifier, and wherein the combiner component, responsive to receiving the request, is configured to perform a plurality of acts, comprising:
retrieving the first obscured linkage that corresponds to the first anonymous identifier from the first dataset; and
responsive to retrieving the first obscured linkage from the dataset, transmitting the first obscured linkage to the second computing partition;
subsequent to transmitting the first obscured linkage to the second computing partition, receiving the second obscured linkage from the second computing partition;
retrieving the second anonymous identifier that corresponds to the second obscured linkage from the first dataset; and
responsive to retrieving the second anonymous identifier, transmitting the second anonymous identifier to the first computing partition.

20. A method comprising:
at a first computing partition:
receiving a request to perform an attribute-based match from a first entity that has specifies an identity of a first attribute;
responsive to receiving the request, searching a first dataset using the first attribute;
retrieving, based upon the searching of the first dataset using the first attribute, an entity-attribute pair identifier that corresponds to the first attribute, the first computing partition unable to ascertain an identity of a second entity corresponding to the entity-attribute pair identifier based upon contents of the first dataset; and transmitting the entity-attribute pair identifier to a second computing partition;

at a second computing partition:

receiving the entity-attribute pair identifier from the first computing partition;

responsive to receiving the entity-attribute pair identifier, searching a second dataset using the entity-attribute pair identifier;

retrieving, based upon the searching of the second dataset using the entity-attribute pair identifier, an anonymous identifier that is representative of the second entity, the second computing partition unable to ascertain the identity of the second entity or the identity of the attribute based upon contents of the second dataset, the first computing partition prevented from accessing the second dataset, and the second computing partition prevented from accessing the first dataset; and causing a signal to be transmitted to the first entity to indicate that to the first entity that another entity has the attribute specified by the first entity.

* * * * *